US009614399B2

(12) United States Patent
Maeno (10) Patent No.: US 9,614,399 B2
(45) Date of Patent: Apr. 4, 2017

(54) CHARGING CONTROL DEVICE USING IN-VEHICLE SOLAR CELL

(71) Applicant: Seigen Maeno, Toyota (JP)

(72) Inventor: Seigen Maeno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 14/654,688

(22) PCT Filed: Dec. 21, 2012

(86) PCT No.: PCT/JP2012/083239
§ 371 (c)(1),
(2) Date: Jun. 22, 2015

(87) PCT Pub. No.: WO2014/097469
PCT Pub. Date: Jun. 26, 2014

(65) Prior Publication Data
US 2015/0349582 A1    Dec. 3, 2015

(51) Int. Cl.
*H01M 10/44* (2006.01)
*H02J 7/35* (2006.01)
(Continued)

(52) U.S. Cl.
CPC .............. *H02J 7/35* (2013.01); *B60L 3/0046* (2013.01); *B60L 7/14* (2013.01); *B60L 8/003* (2013.01); *B60L 11/005* (2013.01); *B60L 11/123* (2013.01); *B60L 11/14* (2013.01); *B60L 11/1809* (2013.01); *B60L 11/1816* (2013.01); *B60L 11/1868* (2013.01); *B60L 2210/10* (2013.01); *B60L 2210/40* (2013.01); *B60L 2220/14* (2013.01); *B60L 2240/12* (2013.01); *Y02T 10/6217* (2013.01); *Y02T 10/7005* (2013.01); *Y02T 10/7022* (2013.01);
(Continued)

(58) Field of Classification Search
CPC ..................................................... H01M 10/44
USPC ......................................................... 320/101
See application file for complete search history.

(56) References Cited

U.S. PATENT DOCUMENTS

| 4,314,198 | A | * | 2/1982 | Rogers | ...................... H02J 7/35 |
| | | | | | 136/291 |
| 5,414,306 | A | * | 5/1995 | Kanno | ...................... H02H 7/00 |
| | | | | | 307/130 |

(Continued)

FOREIGN PATENT DOCUMENTS

| EP | 2 255 990 A1 | 12/2010 |
| JP | H05111112 A | 4/1993 |

(Continued)

*Primary Examiner* — Yalkew Fantu
(74) *Attorney, Agent, or Firm* — Oliff PLC (57) ABSTRACT

A solar ECU included in a charging controller is configured to temporarily store electric power generated by an in-vehicle solar cell of an electric power supply unit in a low-voltage battery when a vehicle is traveling. Further, when the vehicle is traveling, a battery ECU included in the charging controller is configured to maintain a charging relay in an open state (disconnected state) so that the electric power temporarily stored in the low-voltage battery is not supplied to a main battery. On the other hand, when the vehicle is traveling, the solar ECU supplies the electric power temporarily stored in the low-voltage battery to a sub-battery.

9 Claims, 6 Drawing Sheets

(51) Int. Cl.
*B60L 11/18* (2006.01)
*B60L 3/00* (2006.01)
*B60L 7/14* (2006.01)
*B60L 8/00* (2006.01)
*B60L 11/00* (2006.01)
*B60L 11/12* (2006.01)
*B60L 11/14* (2006.01)

(52) U.S. Cl.
CPC ........ *Y02T 10/7066* (2013.01); *Y02T 10/7072* (2013.01); *Y02T 10/7077* (2013.01); *Y02T 10/7083* (2013.01); *Y02T 10/7216* (2013.01); *Y02T 10/7241* (2013.01); *Y02T 90/127* (2013.01); *Y02T 90/14* (2013.01)

(56) References Cited

U.S. PATENT DOCUMENTS

| | | | |
|---|---|---|---|
| 5,569,998 A * | 10/1996 | Cowan | H02J 7/35 136/291 |
| 2008/0084179 A1 * | 4/2008 | Emori | H02J 7/0016 320/109 |
| 2008/0100258 A1 * | 5/2008 | Ward | H01M 10/465 320/101 |
| 2009/0001926 A1 * | 1/2009 | Sato | B60L 3/0046 320/102 |
| 2010/0213887 A1 | 8/2010 | Louch et al. | |
| 2012/0112684 A1 | 5/2012 | Xu et al. | |
| 2013/0314006 A1 * | 11/2013 | Lan | B60L 8/003 318/139 |

FOREIGN PATENT DOCUMENTS

| | | |
|---|---|---|
| JP | H07-123510 A | 5/1995 |
| JP | H10-309002 A | 11/1998 |
| JP | H11191902 A | 7/1999 |
| JP | 2005-253221 A | 9/2005 |
| JP | 2007-228753 A | 9/2007 |
| JP | 2008-189215 A | 8/2008 |
| JP | 2009-248692 A | 10/2009 |
| JP | 2010-239716 A | 10/2010 |
| JP | 2011-501013 A | 1/2011 |
| JP | 2011-083072 A | 4/2011 |
| JP | 2011-188553 A | 9/2011 |
| JP | 2012-056357 A | 3/2012 |
| JP | 2012-071788 A | 4/2012 |
| JP | 2012-075241 A | 4/2012 |
| JP | 2012-075242 A | 4/2012 |
| JP | 2012-161190 A | 8/2012 |

* cited by examiner

| I/G | | | Ready | | Plug-in Charging | | Main Battery | | Charging Destination Battery | | Vehicle Status |
|---|---|---|---|---|---|---|---|---|---|---|---|
| OFF | ACC | ON | OFF | ON | YES | NO | NOT FULLY CHARGED | FULLY CHARGED | MAIN | SUB | |
|  |  | ○ |  | ○ |  | ○ | — | — |  | ○ | (a) |
|  |  | ○ | ○ |  |  | ○ | ○ | — | ○ | ○ | (b-1) |
| ○ |  |  | ○ |  | ○ |  | — | — | ○ | ○ | (b-2) |
| ○ |  |  | ○ |  | ○ |  | ○ | — | ○ |  | (c-1) |
| ○ |  |  | ○ |  |  | — |  | ○ |  | ○ | (c-2) |
|  | ○ |  | ○ |  |  | — | — | — |  | ○ | (d) |

CHARGING CONTROL DEVICE USING IN-VEHICLE SOLAR CELL

TECHNICAL FIELD

The present invention relates to a charging control device configured to control charging of a battery installed in a vehicle, and more particularly, to a charging control device configured to control charging of a battery using a solar cell installed in a vehicle.

BACKGROUND ART

Hitherto, for example, there has been known a charging management device disclosed in Patent Literature 1. This related-art charging management device is installed in a vehicle including an in-vehicle battery to be used as an electric power supply for in-vehicle devices and a solar cell for charging the in-vehicle battery. The solar cell is also capable of being used to charge a rechargeable battery for external devices to be used as an electric power supply to devices external to the vehicle. As a result, for example, when the in-vehicle battery is fully charged, the rechargeable battery for external devices can be charged by the solar cell, enabling the electric power generated by the solar cell installed in the vehicle to be used more efficiently.

Further, hitherto, for example, there has also been known a vehicular power supply control device disclosed in Patent Literature 2. This related-art vehicular power supply control device includes an in-vehicle battery configured to supply electric power to a load group and a solar cell configured to charge the in-vehicle battery using generated electric power. The vehicular power supply control device also includes a storage device configured to store the electric power generated by the solar cell, a switch circuit configured to switch a connection between the solar cell and storage device and the in-vehicle battery on or off, and an operation unit configured to switch the switch circuit on or off.

In addition, hitherto, for example, there has also been known an electric vehicle disclosed in Patent Literature 3. This related-art electric vehicle includes a high-voltage battery configured to drive an electric motor for driving the vehicle, a solar cell, a DC/DC converter for charging configured to supply electric power generated by the solar cell to the high-voltage battery, a charging control electronic control unit (ECU) configured to perform charging control of the high-voltage battery on the DC/DC converter for charging, and a low-voltage power supply DC/DC converter configured to receive a portion of the electric power generated by the solar cell and generate a power supply voltage to be supplied to the charging control ECU.

Still further, hitherto, for example, there has also been known an electric vehicle charging system disclosed in Patent Literature 4. This related-art electric vehicle charging system includes a plurality of solar cell modules formed by wiring solar cell elements together in series so that when sufficient solar light is shone on the solar cell elements, a charging voltage capable of directly charging an auxiliary battery is produced. When the output voltage of the solar cell modules is high, the auxiliary battery is directly charged, and when the output voltage is low, a main battery is charged via a DC/DC converter.

Even still further, hitherto, for example, there has also been known a hybrid vehicle energy regeneration device disclosed in Patent Literature 5. This related-art hybrid vehicle energy regeneration device is configured to store electric power having a large load change generated by regenerative braking of an electric motor during deceleration or electric power generated by a solar cell to an electric dual capacitor. The stored electric power is increased to a predetermined voltage via a charger, and then re-stored in a battery including a lithium ion cell.

Yet even still further, hitherto, for example, there has also been known an electric vehicle control device disclosed in Patent Literature 6. This related-art electric vehicle control device includes a main battery configured to supply electric power to a motor, a first auxiliary battery configured to supply electric power to an electric device in the vehicle, a step-up/step-down transformer configured to step-up and step-down electric power between a drive system circuit and the first auxiliary battery and supply the stepped-up/stepped-down electric power in both directions, a solar panel configured to charge the first auxiliary battery, and a battery control unit configured to control charging and discharging by monitoring remaining levels of the main battery and the first auxiliary battery. Further, in this related-art electric vehicle control device, the battery control unit charges the first auxiliary battery using the solar panel. When the remaining level of the first auxiliary battery reaches a first predetermined value, the battery control unit charges the main battery by increasing the voltage of the electric power of the first auxiliary battery with the step-up/step-down transformer.

CITATION LIST

Patent Literature

[PTL 1] Japanese Patent Application Laid-Open (kokai) No. 2009-248692

[PTL 2] Japanese Patent Application Laid-Open (kokai) No. 2012-56357

[PTL 3] Japanese Patent Application Laid-Open (kokai) No. 2007-228753

[PTL 4] Japanese Patent Application Laid-Open (kokai) No. H07-123510

[PTL 5] Japanese Patent Application Laid-Open (kokai) No. H10-309002

[PTL 6] Japanese Patent Application Laid-Open (kokai) No. 2012-75242

SUMMARY OF INVENTION

In the related-art devices, systems, vehicles, and the like disclosed in Patent Literatures 1 to 6, the electric power generated by the solar cell (solar panel) can be supplied to and stored in the main battery configured to supply high-voltage electric power to the motor. The main battery configured to supply electric power to the motor is usually a high-voltage battery. In this case, in order to properly ensure reliability and safety, particularly for a vehicle that is traveling, the main battery is strictly controlled and managed by operating various electronic components and the like in order to execute high-voltage system management, high-voltage battery control, opening/closing control of an electric power opening/closing device (a relay etc.), and power supply control.

Incidentally, when a solar cell is installed in a vehicle (hereinafter referred to as "in-vehicle solar cell"), and the electric power generated by the in-vehicle solar cell used, the maximum amount of generated electric power can be estimated based on the size of the vehicle body (i.e., the installed surface area of the in-vehicle solar cell). Currently, the maximum amount of generated electric power is small, at about a few hundred watts. On the other hand, electric power is also required in order to suitably operate the above-mentioned various electronic components and the like. Consequently, when trying to supply the electric power generated by the in-vehicle solar cell while suitably operating the various electronic components and the like in order to properly ensure reliability and safety while the vehicle is traveling, in some situations the level of electric power required to operate the various electronic components and the like may exceed the generated electric power. In this case, there is an increased likelihood that the generated power cannot be stored in the main battery, and hence no benefit is gained.

In addition, in the related-art devices, systems, vehicles, and the like disclosed in Patent Literatures 1 to 6, for example, the charging destination of the electric power generated by the in-vehicle solar cell is managed based on the battery voltage and the state of charge of the main battery supplying high-voltage electric power to the motor. Although this may at first appear to be a rational way to manage charging, issues such as competition with other functions using the generated electric power and competition among the controls can occur. In order to deal with such competition, it is necessary for the system to become more complicated (complex) and for highly complex controls to be performed in order to ensure reliability and safety. This can cause development scale and development costs to increase.

The present invention is directed to solving the above-mentioned problems. It is an object of the present invention to provide a charging control device configured to use an in-vehicle solar cell, the charging control device being modified so that electric power generated by the in-vehicle solar cell can be suitably supplied.

In order to achieve the above-mentioned object, according to one embodiment of the present invention, there is provided a charging control device configured to use an in-vehicle solar cell, which is to be applied to the vehicle, the vehicle including: a motor generator configured to generate a driving force and to generate regenerative electric power; a main battery electrically connected to the motor generator, the main battery being configured to supply electric power to the motor generator and to store the regenerative electric power; and a sub-battery configured to supply electric power to various accessory devices mounted on the vehicle, the vehicle being capable of traveling using at least the driving force generated by the motor generator. Examples of such a vehicle that can be adopted include an electric vehicle (EV), a hybrid vehicle (HV), and a plug-in hybrid vehicle (PHV).

Further, the charging control device configured to use an in-vehicle solar cell according to the one embodiment of the present invention includes an electric power supply unit and a charging control unit. The electric power supply unit includes the in-vehicle solar cell installed in the vehicle, and is configured to supply electric power generated by the in-vehicle solar cell to at least one of the main battery and the sub-battery. The charging control unit is configured to control charging of at least one of the main battery and the sub-battery using the electric power generated by the in-vehicle solar cell and supplied from the electric power supply unit.

A feature of the charging control device configured to use an in-vehicle solar cell according to the one embodiment of the present invention resides in that the charging control unit is configured to, when the vehicle is traveling, prevent the electric power generated by the in-vehicle solar cell from being supplied from the electric power electric power unit to the main battery. Note that, in this case, the charging control unit may include traveling determination means for determining whether or not the vehicle is traveling and disconnecting means for disconnecting a connection between the electric power supply unit and the main battery. When it is determined by the traveling determination means that the vehicle is traveling, the disconnecting means can prevent the electric power generated by the in-vehicle solar cell from being supplied from the electric power supply unit to the main battery by disconnecting the connection between the electric power supply unit and the main battery.

According to this, when the vehicle is traveling, that is, when there is a possibility that the electric power of the main battery is being supplied to the motor generator, the electric power generated by the in-vehicle solar cell can be prevented from being supplied to the main battery directly from the in-vehicle solar cell, or via a storage device configured to temporarily store the generated electric power. This eliminates the need to execute more complex controls without having an effect on how the main battery is managed based on, for example, high-voltage system management, high-voltage battery control, opening/closing control of an electric power opening/closing device (a relay etc.), and power supply control, namely, by avoiding competition among the controls and the like. Therefore, an increase in development scale and in development costs can be suppressed, and the electric power generated by the in-vehicle solar cell can be appropriately used.

In this case, the charging control unit can supply the electric power generated by the in-vehicle solar cell from the electric power supply unit to the sub-battery when the vehicle is traveling. Note that, in this case, the charging control unit may include supply means for supplying or disconnecting the electric power generated by the in-vehicle solar cell from the electric power supply unit to the sub-battery. When it is determined by the traveling determination means that the vehicle is traveling, the supply means can supply the electric power generated by the in-vehicle solar cell from the electric power supply unit to the sub-battery. Consequently, when the vehicle is traveling, the electric power generated by the in-vehicle solar cell can be stored (accumulated) in the low-voltage sub-battery without executing the above-mentioned highly complex management operations and controls on the main battery, which enables the electric power generated by the in-vehicle solar cell to be used in an efficient manner.

Further, in those cases, the electric power supply unit may include a low-voltage battery configured to temporarily store the electric power generated by the in-vehicle solar cell, and the charging control unit may be configured to at least, when the vehicle is traveling, supply the electric power generated by the in-vehicle solar cell and temporarily stored in the low-voltage battery to the sub-battery.

According to this, the electric power generated by the in-vehicle solar cell can be temporarily stored in the low-voltage battery, and when the vehicle is traveling, the generated electric power can be supplied to the sub-battery. Further, by temporarily storing the electric power generated by the in-vehicle solar cell in the low-voltage battery in this manner, when the vehicle is not traveling, for example, when the vehicle is stopping or parking, not only can the electric power be supplied to the sub-battery, but the electric power can also be supplied to the main battery. Consequently, the electric power generated by the in-vehicle solar cell can be used in an efficient manner.

Further, in those cases, the charging control unit may be configured to permit, when the vehicle is not traveling, the electric power generated by the in-vehicle solar cell to be supplied from the electric power supply unit to the main battery.

According to this, when the vehicle is not traveling, for example, when the vehicle is stopping or parking, the electric power generated by the in-vehicle solar cell can be supplied from the electric power supply unit to the main battery. In this case, because the vehicle is not traveling, the electric power generated by the in-vehicle solar cell can be supplied to and stored in the main battery based on the same charging controls as for an ordinary EV, HV, or PHV, for example. Therefore, the main battery can be charged using the generated electric power without executing separate complex controls.

In this case, the charging control unit may be configured to permit, when a level of the electric power generated by the in-vehicle solar cell is more than a predetermined electric power level set in advance, the electric power generated by the in-vehicle solar cell to be supplied from the electric power supply unit to the main battery. In this case, more specifically, for example, it is preferred that the predetermined electric power level be set based on a level of electric power consumed by various electronic components operating as a result of the charging control of the main battery.

According to those, when the level of electric power generated by the in-vehicle solar cell is more than the level of electric power consumed by the various electronic components operating when charging the main battery on which high-voltage management and control are being strictly carried out, the electric power generated by the in-vehicle solar cell can be supplied to and stored in the main battery. Consequently, when charging the main battery using the electric power generated by the in-vehicle solar cell, a situation in which the main battery cannot be charged because the supplied electric power is being consumed by the operation of the various electronic components can be prevented. Further, when the level of electric power generated by the in-vehicle solar cell is more than the level of electric power consumed by the various electronic components, the operating frequency of the various electronic components can be appropriately reduced by quickly executing the charging of the main battery. As a result, the amount of wasted electric power that is consumed without being stored in the main battery can be suppressed, with the result that the electric power generated by the in-vehicle solar cell can be used in a more efficient manner.

Further, another feature of the charging control device configured to use an in-vehicle solar cell according to the one embodiment of the present invention also resides in that: the electric power supply unit is further configured to supply, when the vehicle is not traveling, electric power supplied externally from the vehicle to at least the main battery; and the charging control unit is configured to supply the electric power generated by the in-vehicle solar cell to the main battery or the sub-battery based on a supply state of the external electric power in the electric power supply unit. Note that, in this case, the electric power supply unit may include external electric power supply means for supplying the electric power supplied externally from the vehicle to at least the main battery.

According to this, when the vehicle is not traveling, the electric power generated by the in-vehicle solar cell can be supplied to the main battery or the sub-battery depending on the supply state of the external electric power to at least the main battery, for example, depending on whether electric power is being supplied (charging) because the main battery is not fully charged or whether the supply electric power is disconnected because the main battery is fully charged (charging completed). Consequently, for example, the supply state of the external electric power can be determined using the same control as for an ordinary EV or PHV. Therefore, the electric power generated by the in-vehicle solar cell can be used in a more efficient manner without executing complex controls.

In this case, more specifically, the charging control unit may be configured to supply, when the electric power supply unit is charging the main battery by supplying the external electric power to the main battery, the electric power generated by the in-vehicle solar cell to the main battery. According to this, the electric power required in order to charge the battery can be met by the external electric power and the electric power generated by the in-vehicle solar cell. Therefore, the amount of electric power bought from, for example, the commercial power supply as the external electric power can be reduced by the amount of electric power that is generated by the in-vehicle solar cell, allowing the costs incurred by charging to be decreased.

Further, of the electric power stored in the main battery, the ratio of the electric power generated by the in-vehicle solar cell, namely, the ratio of renewable energy, can be increased. As a result, for example, depending on the region in which the vehicle is traveling, fuel consumption (electricity consumption) may be calculated based on the ratio of the electric power generated by the in-vehicle solar cell, and from an environmental protection perspective, the driver or an occupant may receive preferential treatment due to improved fuel consumption (electricity consumption).

Further, in those cases, the charging control unit may be configured to supply, when the charging of the main battery is complete, the electric power generated by the in-vehicle solar cell to the sub-battery. According to this, dark current consumed by the various accessory devices that are being operated can be suitably compensated for with the electric power supplied from the sub-battery. Therefore, the sub-battery can be prevented from becoming "dead" in advance. Further, by changing the supply destination (charging destination) of the electric power generated by the in-vehicle solar cell to the sub-battery when the charging of the main battery is complete, overcharging of the main battery can be avoided, with the result that the main battery can be suitably protected.

Further, still another feature of the charging control device configured to use an in-vehicle solar cell according to the one embodiment of the present invention also resides in that the charging control unit is configured to supply, when the vehicle is not traveling, and when the various accessory devices are operating based on an operation request from an occupant in the vehicle, the electric power generated by the in-vehicle solar cell from the electric power supply unit to the sub-battery.

According to this, the supply destination (charging destination) of the electric power generated by the in-vehicle solar cell can be selected based on the wishes of the occupant in the vehicle. Consequently, for example, even when the vehicle is not traveling, and hence normally the electric power generated by the in-vehicle solar cell is supplied to the main battery based on the state of charge, if the occupant requests operation of the various accessory devices (specifically, such as by switching the ignition to the accessory position), the sub-battery can be preferentially selected as the charging destination based on the occupant's wishes. Therefore, by supplying the electric power generated by the in-vehicle solar cell to the sub-battery, even when the various accessory devices are being operated, the sub-battery can be suitably prevented from becoming "dead".

DESCRIPTION OF EMBODIMENTS

A charging control device (hereinafter simply referred to as "the device") using an in-vehicle solar cell according to one embodiment of the present invention is now described with reference to the drawings.

Figure 1:
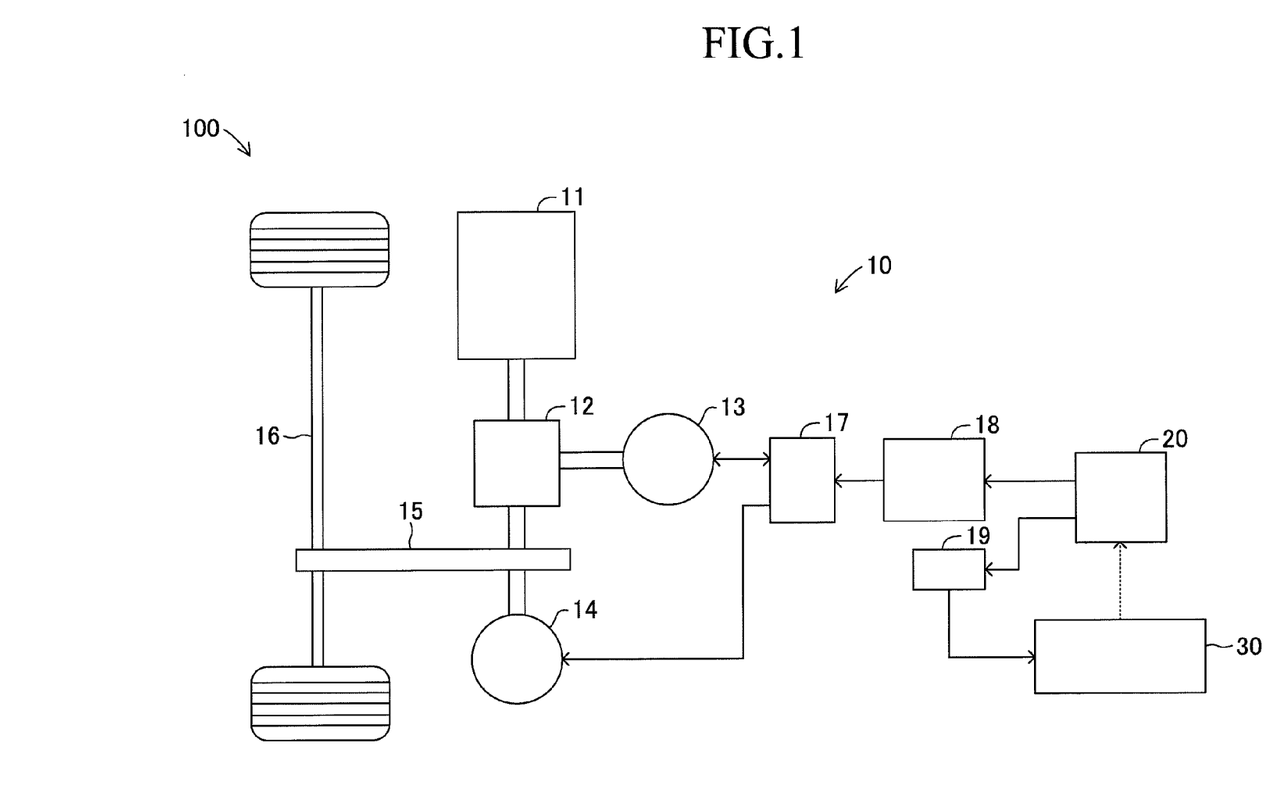
FIG. 1 is a schematic function block diagram of a vehicle to which a charging control device configured to use an in-vehicle solar cell is applied according to an embodiment of the present invention.

FIG. 1 is a block diagram for illustrating a configuration of a vehicle 100 to which the device can be applied. Examples of vehicles that may be used as the vehicle 100 to which the device can be applied include an electric vehicle (EV), which includes a motor generator driven by electric power from an installed main battery and which charges the main battery using regenerative electric power and an external power supply supplied from a charging station and the like, a hybrid vehicle (HV) including a motor generator and an engine, and a plug-in hybrid vehicle (PHV) capable of charging a main battery by using an external power supply additionally compared with a hybrid vehicle (HV). Note that, in this embodiment, a description is given with an example in which the vehicle 100 is a plug-in hybrid vehicle (PHV).

As illustrated in FIG. 1, the vehicle 100 according to this embodiment includes, in addition to a driving force generation unit 10, an electric power supply unit 20 and a charging controller 30 as a charging control unit included in the device. The driving force generation unit 10 includes an engine 11, a motive power dividing mechanism 12, motor generators 13 and 14, a transmission gear 15, a drive axle 16, a power controller unit (PCU) 17, a main battery 18, and a sub-battery 19. The engine 11 is configured to output motive power by combustion of a hydrocarbon-based fuel, such as gasoline or diesel fuel. In the vehicle 100, the motive power (kinetic energy) output by the engine 11 drives, via the motive power dividing mechanism 12, the transmission gear 15, which is configured to transmit motive power to the drive axle 16 (wheels).

The motive power dividing mechanism 12 is coupled to the engine 11, the motor generator 13 (14), and the transmission gear 15, and distributes motive power among those units. As the motive power dividing mechanism 12, for example, a planetary gear having three axes of rotation, from a sun gear, a planetary carrier, and a ring gear, may be employed. The motor generator 13 is connected to the sun gear. The engine 11 is connected to the carrier. The drive axle 16 and the motor generator 14 are connected to the ring gear via the transmission gear 15.

The motor generators 13 and 14 are three-phase synchronous generator-motors controlled by the PCU 17. When electric power from the main battery 18 is supplied, the motor generators 13 and 14 function as electric motors, and when external (e.g., from the engine 11) motive power (kinetic energy) is transmitted, the motor generators 13 and 14 function as electric generators. Specifically, the motor generator 13 functions as an electric generator when motive power (kinetic energy) from the engine 11 that has been divided by the motive power dividing mechanism 12 is transmitted, and the motor generator 13 also functions as a starter motor capable of starting the engine 11. The motor generator 14 functions as an electric motor (a motive power source) for driving the transmission gear 15 configured to transmit a driving force to the drive axle 16 (wheels). Note that, in this embodiment, although the motor generator 13 functions as an electric generator and the motor generator 14 functions as an electric motor, obviously the motor generator 14 may function as an electric generator and the motor generator 13 may function as an electric motor, or, the motor generators 13 and 14 may both function as electric generators or electric motors.

The main battery 18, which is a so-called high-voltage power supply, is electrically connected to the motor generators 13 and 14 via the PCU 17. The sub-battery 19, which is a so-called low-voltage power supply as an auxiliary battery, is electrically connected to various electronic control units including the charging controller 30 installed in the vehicle 100, and various accessory devices installed in the vehicle 100.

Figure 2:
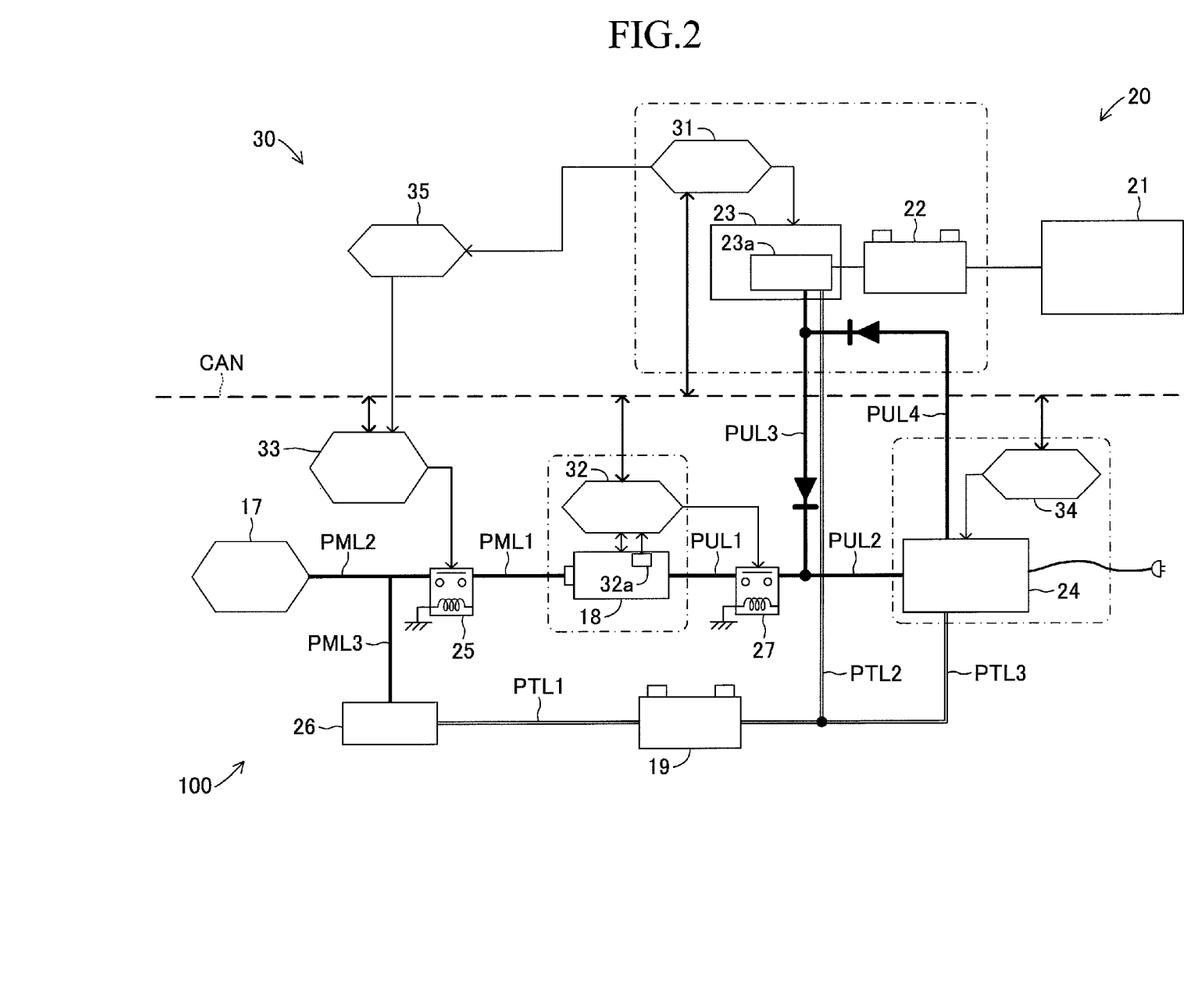
FIG. 2 is a block diagram for schematically illustrating a configuration of an electric power supply unit and a charging controller installed in the vehicle illustrated in FIG. 1.

As illustrated in FIG. 2, the electric power supply unit 20 included in the device includes an in-vehicle solar cell 21, a low-voltage battery 22, a solar charger 23, and a plug-in charger 24. The in-vehicle solar cell 21, which is mounted on, for example, the roof of the vehicle 100, is configured to convert solar energy into electrical energy. Note that, in the following description, the electric power generated by the in-vehicle solar cell 21 is also referred to as "electric power generated from solar light". The low-voltage battery 22 is configured to temporarily store the low-voltage electric power generated by the in-vehicle solar cell 21, and, as described later, output electric power to the main battery 18 and/or the sub-battery 19. Therefore, the low-voltage battery 22 is electrically connected to the in-vehicle solar cell 21 via a fuse, a blocking diode, and the like (not shown).

The solar charger 23 is configured to supply the electric power temporarily stored in the low-voltage battery 22 to the main battery 18 and/or the sub-battery 19. Therefore, the solar charger 23 includes a charging control circuit 23a for supplying the electric power temporarily stored (accumulated) in the low-voltage battery 22, namely, the electric power generated from solar light, to the main battery 18 and/or the sub-battery 19. Although not shown, the charging control circuit 23a includes a high-voltage charging DC/DC converter configured to raise (pump up) the low-voltage electric power (electric power generated from solar light) stored (accumulated) in the low-voltage battery 22 to a high voltage, and supply that high-voltage electric power to the main battery 18, and a low-voltage charging DC/DC converter configured to supply low-voltage electric power stored in the low-voltage battery 22 to the sub-battery 19.

The plug-in charger 24 is, for example, configured to be electrically connected to a charging station and the like installed in a person's home or at a public facility via a cable or in a contactless manner, to convert alternating current supplied as an external power supply (specifically, a commercial power supply) into direct current, and supply that direct current to charge the main battery 18 and/or the sub-battery 19. Therefore, the plug-in charger 24 includes, for example, an electric power circuit including a smoothing capacitor, a voltage converter, an inverter circuit, and the like (not shown).

Further, as illustrated in FIG. 2, the electric power supply unit 20 includes a system main relay 25 arranged on a driving electric power supply path linking the main battery 18 and the PCU 17 (namely, motor generators 13 and 14). The system main relay 25 is arranged between a high-voltage power supply line PML1 on the main battery 18 side and a high-voltage power supply line PML2 on the PCU 17 side. Based on an opening/closing operation, the system main relay 25 selectively switches between connection and disconnection between the PCU 17 (namely, motor generators 13 and 14), and the main battery 18. In addition, as illustrated in FIG. 2, the electric power supply unit 20 includes a DC/DC converter 26 arranged between a high-voltage power supply line PML3, which is connected to the high-voltage power supply line PML2 on the PCU 17 side, and the sub-battery 19.

The DC/DC converter 26 is configured to convert (reduce) the voltage of the high-voltage power supply of the high-voltage power supply line PML3, which is on an upstream side, to a low voltage, and supply the low-voltage power supply to the sub-battery 19 via a low-voltage power supply line PTL1, which is on a downstream side. Note that, as illustrated in FIG. 2, the solar charger 23 and the sub-battery 19 are connected to each other via a low-voltage power supply line PTL2, and the plug-in charger 24 and the sub-battery 19 and connected to each other via a low-voltage power supply line PTL3. Further, in FIG. 2 and FIG. 4 to FIG. 6 described below, the power supply lines along which the high-voltage power supply flows are represented by bold, solid lines, and the power supply lines along which the low-voltage power supply flows are represented by double lines.

In addition, as illustrated in FIG. 2, the electric power supply unit 20 includes a charging relay 27 as disconnecting means arranged on the charging electric power supply path linking the solar charger 23 and the plug-in charger 24 with the main battery 18. The charging relay 27 is arranged between a charging power supply line PUL1 on the main battery 18 side and a charging power supply line PUL2 on the plug-in charger 24 (solar charger 23) side. In this case, the solar charger 23 is electrically connected to the charging power supply line PUL2 via a charging power supply line PUL3. Further, although the plug-in charger 24 is directly connected to the charging power supply line PUL2, the plug-in charger 24 is electrically connected to the charging power supply line PUL3 via a charging power supply line PUL4. Note that, a blocking diode for preventing current from flowing from the charging power supply line PUL2 side to the solar charger 23 side is arranged on the charging power supply line PUL3, and a blocking diode for preventing current from flowing from the charging power supply line PUL3 side to the plug-in charger 24 side is arranged on the charging power supply line PUL4.

As illustrated in FIG. 2, the charging controller 30 as the charging control unit included in the device includes a solar ECU 31 and a battery ECU 32. The solar ECU 31 is a microcomputer including a central processing unit (CPU), a read-only memory (ROM), a random-access memory (RAM), and the like as main constituent components. The solar ECU 31 is configured to control charging of (storing of) electric power in) the low-voltage battery 22 with the electric power generated by the in-vehicle solar cell 21 and operation of the solar charger 23 in an integrated manner.

The battery ECU 32 is also a microcomputer including a CPU, a ROM, a RAM, and the like as its main constituent components. The battery ECU 32 is configured to control charging of the main battery 18 in an integrated manner by monitoring the charging state of the main battery 18, and controlling operation of the charging relay 27. For this purpose, a known charging sensor 32a is connected to the battery ECU 32. The charging sensor 32a, which is mounted in the main battery 18, is configured to detect a state of charge (SOC) of the main battery 18, and output a signal representing the SOC to the battery ECU 32. As a result, the battery ECU 32 manages and controls charging of the main battery 18 based on a charging state, namely, the SOC, of the main battery 18 detected by the charging sensor 32a.

Further, as illustrated in FIG. 2, the charging controller 30 includes a hybrid ECU 33. The hybrid ECU 33, which operates the engine 11 and the motor generators 13 and 14 in cooperation with one another, is configured to control the driving force for enabling the vehicle 100 to travel. Therefore, the hybrid ECU 33 is also a microcomputer including a CPU, a ROM, a RAM, and the like as main constituent components, and is configured to control a switching operation of the system main relay 25 when the vehicle 100 is traveling and during charging of the vehicle 100. In addition, the charging controller 30 also includes a plug-in ECU 34. The plug-in ECU 34 is configured to control operation of the plug-in charger 24 in an integrated manner. For this purpose, the plug-in ECU 34 is also a microcomputer including a CPU, a ROM, a RAM, and the like as main constituent components.

The hybrid ECU 33, in cooperation with at least the battery ECU 32, strictly executes high-voltage system management and high-voltage battery control relating to the main battery 18, opening/closing operation management of the system main relay 25 and the charging relay 27, the power supply controls required for the vehicle 100 to travel, and the like. Therefore, various electronic components are installed around the main battery 18 in the vehicle 100. Note that, those electronic components are not shown in FIG. 2 because those components are well known in the art. Executing the above-mentioned various management and control operations with the various electronic components ensures the reliability and safety of the vehicle 100 in which the high-voltage battery main battery 18 is mounted.

Further, as illustrated in FIG. 2, the solar ECU 31, the battery ECU 32, the hybrid ECU 33, and the plug-in ECU 34 are capable of communicating to/from each other via a communication line (e.g., a CAN communication line) built in the vehicle 100. In particular, as illustrated in FIG. 2, the solar ECU 31 and the hybrid ECU 33 are directly connected to each other via a verification ECU 35 (a microcomputer). As a result, the solar ECU 31 can communicate to/from the hybrid ECU 33 after the solar ECU 31 has been verified by the verification ECU 35. Consequently, as described later, this enables various signals (start signals etc.) to be directly supplied.

Next, the operations of the charging controller 30 included in the device are described in more detail. First, the operations performed when the vehicle 100 is traveling are described. When an ignition (I/G) (not shown) is turned on by the driver, and the hybrid ECU 33 has switched the system main relay 25 to a closed state (connected state), the vehicle 100 is in a so-called "Ready ON" state in which the vehicle 100 is capable of traveling based on the motive power of at least the motor generator 14. Note that, for example, when the SOC of the main battery 18 being managed by the battery ECU 32 is a predetermined SOC or more, the hybrid ECU 33 switches the system main relay 25 to a closed state (connected state), namely, the vehicle 100 is in a "Ready ON" state.

In other words, in the "Ready ON" state, the high-voltage power supply line PML1 on the main battery 18 side and the high-voltage power supply line PML2 on the PCU 17 side are maintained in a state in which the high-voltage power supply line PML1 and the high-voltage power supply line PML2 are connected to each other by various electronic components, including the system main relay 25. Consequently, while the vehicle 100 is traveling, in cooperation with the battery ECU 32, the hybrid ECU 33 supplies high-voltage electric power from the main battery 18 to the motor generator 14 (13) via the PCU 17 by controlling the power supply in a known manner. Consequently, the motor generator 14 (13) generates a predetermined driving force based on operation of the accelerator by the driver, and transmits the driving force to the drive axle 16 (wheels) via the transmission gear 15.

Further, when the vehicle 100 is traveling, or more specifically, when the vehicle 100 is in a "Ready ON" state, the hybrid ECU 33 switches the charging relay 27 to an open state (disconnected state) with respect to the battery ECU 32. As a result, the charging power supply line PUL1 on the main battery 18 side and the charging power supply line PUL2 on the plug-in charger 24 (solar charger 23) side are maintained in a state in which the charging power supply line PUL1 and the charging power supply line PUL2 are disconnected from each other by various electronic components, including the charging relay 27. In other words, while the vehicle 100 is traveling, the main battery 18 is maintained in a state in which the main battery 18 is completely (absolutely) disconnected from the solar charger 23 and the plug-in charger 24 based on known high-voltage system management and high-voltage battery management operations.

As a result, while the vehicle 100 is traveling, electric power is prevented from being supplied from the solar charger 23, thereby preventing the main battery 18 from being charged. Note that, while the vehicle 100 is traveling, because an electrical connection is not established between the plug-in charger 24 and the charging station arranged externally to the vehicle 100, the main battery 18 is not charged using an external power supply.

In a state in which the traveling vehicle 100 is slowing down (e.g., the driver has pressed the brake), the hybrid ECU 33 performs a regeneration control with the motor generator 13 (14) via the PCU 17 to convert the kinetic energy of the vehicle 100 into recovered electrical energy. In other words, when the vehicle 100 is slowing down, based on regeneration control performed by the hybrid ECU 33 and the PCU 17, the motor generator 13 (14) converts the kinetic energy transmitted from the drive axle 16 (wheels) via the transmission gear 15 and the motive power dividing mechanism 12 into electrical energy.

The PCU 17 outputs the converted electrical energy, namely, the recovered electric power, to the high-voltage power supply line PML2 as regenerated electric power. At this point, because the vehicle 100 is in a "Ready ON" state and the system main relay 25 is maintained in a closed state (connected state), the high-voltage power supply line PML2 is connected to the high-voltage power supply line PML1 on the main battery 18 side. Consequently, when regenerated electric power produced by the regeneration control is output, the voltage of the regenerated electric power is increased by various electronic components (not shown) (specifically, a DC/DC converter etc.) and the resultant electric power is stored in the main battery 18. Alternatively, the voltage of the regenerated electric power produced by the regeneration control and output to the high-voltage power supply line PML3 is reduced by the DC/DC converter 26. The resultant electric power is output to the low-voltage power supply line PTL1, and stored in the sub-battery 19.

Next, charging control of the main battery 18 or the sub-battery 19 of the vehicle 100 by the charging controller 30 is described in various different situations.

(a) When the Vehicle 100 is Traveling

As described above, when the vehicle 100 is traveling, the battery ECU 32 of the charging controller 30 maintains the charging relay 27 arranged between the main battery 18 and the solar charger 23 in an open state (disconnected state) in order to give priority to reliability and safety in view of the fact that a high-voltage power supply is being handled. However, when the vehicle 100 is traveling, if the in-vehicle solar cell 21 is in a state capable of generating electric power, specifically, during daytime on a fine day, the in-vehicle solar cell 21 generates electric power by converting solar energy into electrical energy. In this case, the solar ECU 31 of the charging controller 30 temporarily stores the electric power generated by the in-vehicle solar cell 21, namely, electric power generated from solar light, in the low-voltage battery 22.

Figure 3:
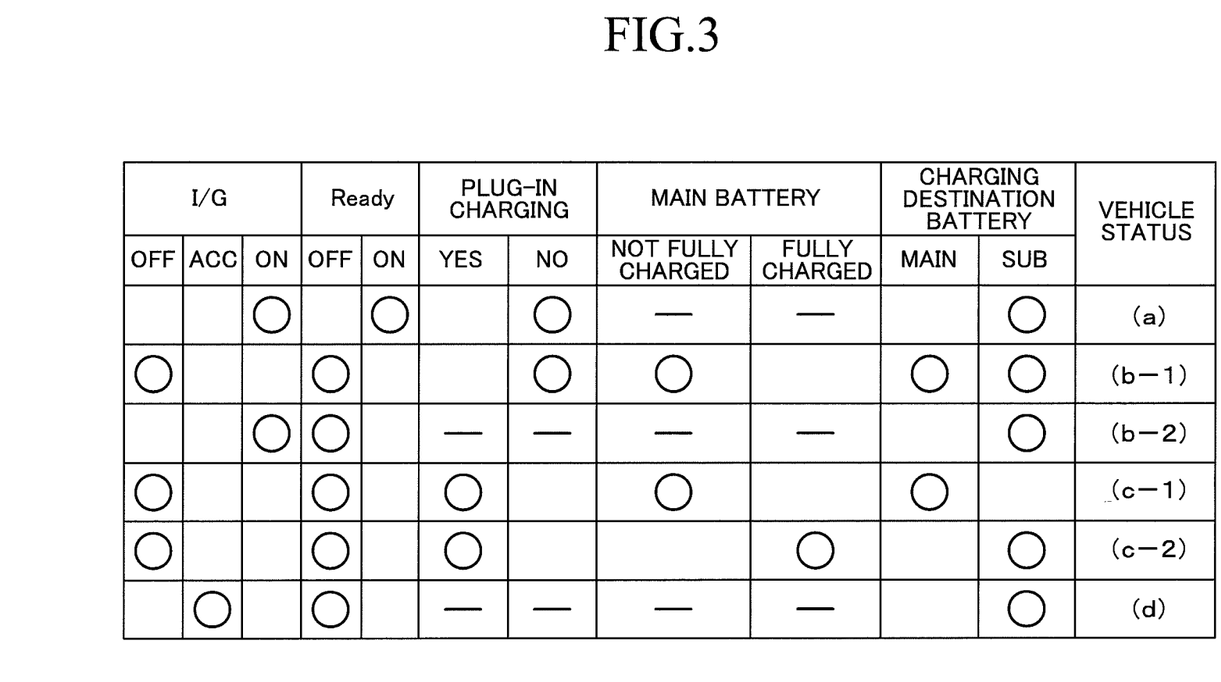
FIG. 3 is a table for showing a relationship between a vehicle status and a charging destination.

When the vehicle 100 is traveling, specifically, as illustrated in FIG. 3, when the ignition (I/G) in the vehicle 100 is in an ON state, and, the vehicle 100 is in a "Ready ON" state, the solar ECU 31 selects the sub-battery 19 as the charging destination, and supplies the electric power generated from solar light temporarily stored in the low-voltage battery 22 to the sub-battery 19. In other words, the solar ECU 31 uses a low-voltage charging DC/DC converter in the charging control circuit 23a of the solar charger 23 to transform and rectify the electric power generated from solar light into a predetermined voltage, and then supplies and stores the electric power generated from solar light in the sub-battery 19 via the low-voltage power supply line PTL2. Note that, in this case, obviously the solar charger 23 (solar ECU 31) supplies the electric power generated from solar light to the sub-battery 19 so that the sub-battery 19 is not overcharged, based on an SOC detected by a charging sensor (not shown) included in the sub-battery 19.

Thus, when the vehicle 100 is traveling, because the solar ECU 31 selects the sub-battery 19 as the charging destination, only a low-voltage power supply is handled in the vehicle 100 without the voltage of the electric power generated from solar light being substantially increased. In other words, when the vehicle 100 is traveling, if the main battery 18 is selected as the charging destination, a high-voltage power supply having a significantly increased voltage that has been obtained from the electric power generated from solar light needs to be handled in the vehicle 100. When handling the electric power generated from solar light as a high-voltage power supply, there is an inevitable increase in complexity in order to avoid competition among the system management and charging control operations required to ensure the reliability and safety of the high-voltage battery main battery 18. In contrast, when the sub-battery 19 is selected as the charging destination, a low-voltage power supply can be handled in the same manner as in EVs, HVs, PHVs, and traditional vehicles, and as a result, the system and charging control can be simplified.

(b) When the Vehicle 100 is Stopping or Parking

For example, when it is determined based on a detected vehicle speed and the like that the vehicle 100 is stopping or parking, there is no need to supply a high-voltage power supply to the motor generator 14, and hence the hybrid ECU 33 switches the system main relay 25 to an open state (disconnected state). When the hybrid ECU 33 switches the system main relay 25 to an open state (disconnected state) in this manner, the vehicle 100 is, at the very least, in a state in which the vehicle 100 is not traveling based on a driving force from the motor generator 14, namely, is in a "Ready OFF" state. In this "Ready OFF" state, the charging controller 30 uses a different charging destination when the ignition (I/G) is in an on state from that when the ignition (I/G) is in an off state. This operation is now described in more detail.

(b-1) "Ready OFF" State in which the I/G is in an Off State

Figure 4:
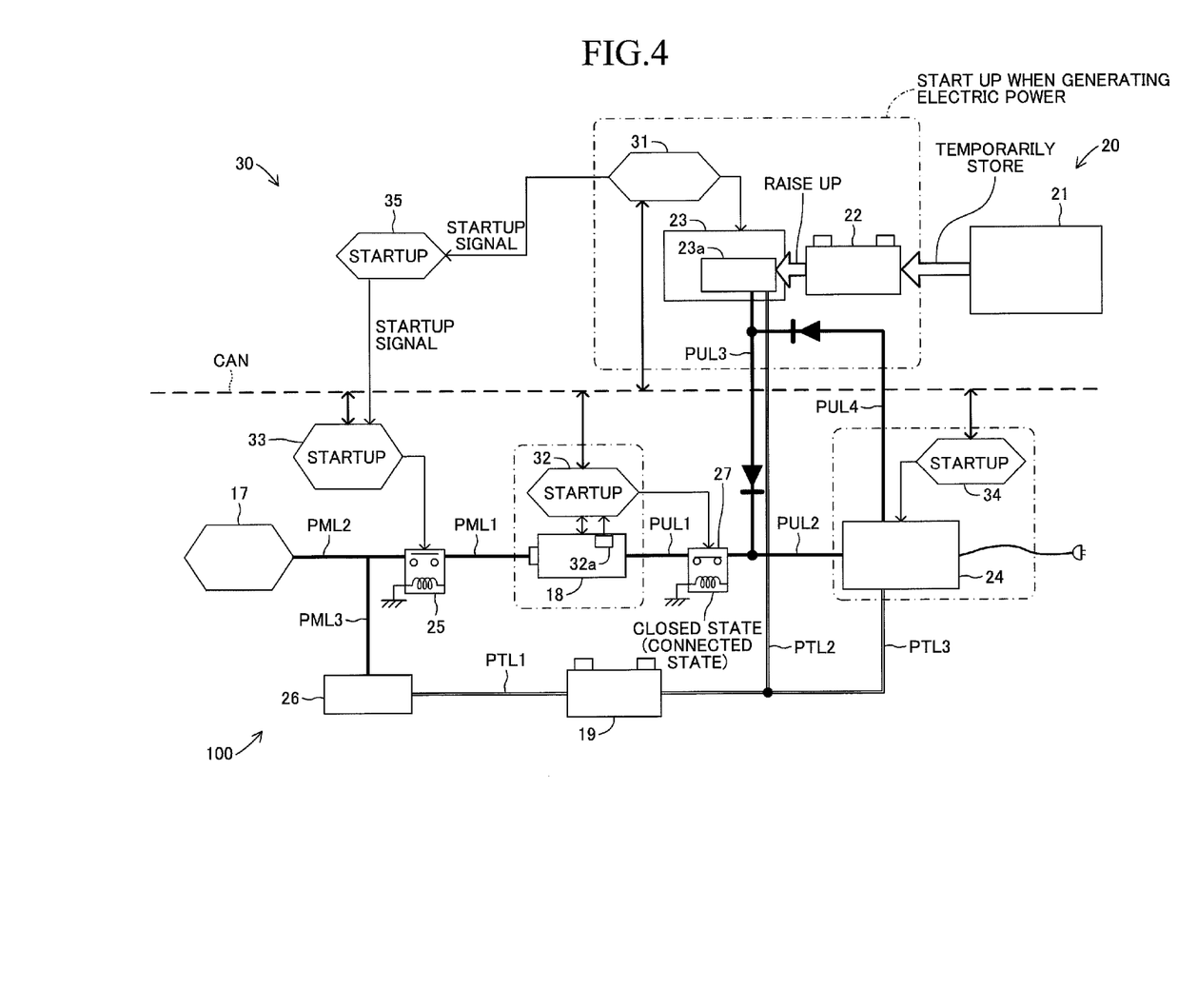
FIG. 4 is a diagram for illustrating operation of the electric power supply unit and the charging controller according to the embodiment of the present invention.

When the vehicle 100 is in a "Ready OFF" state, as illustrated in FIG. 4, the battery ECU 32 may switch the charging relay 27 to a closed state (connected state). As a result, when the driver has switched the ignition (I/G) to an off state and the vehicle 100 is stopping or parking, namely, when the vehicle 100 is not traveling, the electric power generated from solar light that is temporarily stored in the low-voltage battery 22 may be supplied to and stored in the main battery 18. This charging operation of the main battery 18 is now described in more detail.

As shown in FIG. 3, when the ignition (I/G) in the vehicle 100 is in an off state, and, the vehicle 100 is in a "Ready OFF" state, the solar ECU 31 selects the main battery 18, which is in a not-fully charged state, as the charging destination, and supplies the electric power generated from solar light temporarily stored in the low-voltage battery 22 to the main battery 18. Note that, in this case, the plug-in charger 24 may not be electrically connected to a charging station. In other words, this operation may be carried out on condition that there are no means for supplying electric power to the main battery 18 other than the solar charger 23.

As described above, various electronic components, including the system main relay 25, the charging relay 27, and the like, are arranged in the vicinity of the main battery 18 in order to handle the high-voltage power supply safely. Further, in order to monitor the state of the main battery 18 and to control charging of the main battery 18, the battery ECU 32, the hybrid ECU 33, the plug-in ECU 34, the verification ECU 35, and the like need to be made to operate. In addition, in order to operate the various electronic components and the various ECUs, a predetermined operational electric power is required.

Therefore, when the electric power generated from solar light is to be supplied to and stored in the main battery 18, the solar ECU 31 executes charging control when the level of electric power temporarily stored in the low-voltage battery 22 is at least a predetermined operational electric power level or more. If the level of the electric power generated from solar light stored in the low-voltage battery 22 is the predetermined operational electric power level or more, the electric power generated from solar light can be stored in the main battery 18 even if electric power is consumed from operation of the above-mentioned various electronic components and various ECUs.

Specifically, the solar ECU 31 determines whether or not the amount of electric power generated from solar light generated by the in-vehicle solar cell 21 and temporarily (provisionally) stored in the low-voltage battery 22, namely, the SOC of the low-voltage battery 22, is higher than an SOC corresponding to the above-mentioned predetermined operational electric power. By charging the main battery 18 each time the SOC of the low-voltage battery 22 is higher than the SOC corresponding to the predetermined operational electric power, the frequency with which the various below-mentioned electronic components and the various ECUs are operated (started up) can be reduced. As a result, the electric power consumed each time the various electronic components and the various ECUs are operated (started up), namely, the electric power consumed by operating the devices required to charge the main battery 18, can be reduced, with the result that the electric power generated from solar light can be efficiently stored in the main battery 18.

After the electric power generated from solar light has been stored until the SOC of the low-voltage battery 22 is higher than the SOC corresponding to the predetermined operational electric power, as illustrated in FIG. 4, verification is performed by the verification ECU 35, and the solar ECU 31 outputs startup signals to start the hybrid ECU 33 and the battery ECU 32 and the plug-in ECU 34 that operate in cooperation with the hybrid ECU 33 in order to safely charge the main battery 18. The hybrid ECU 33, which has been started by the output startup signal, maintains the system main relay 25 in an open state (disconnected state). The battery ECU 32 started by the output startup signal switches the charging relay 27 from an open state (disconnected state) to a closed state (connected state), thereby connecting the charging power supply line PUL1 on the main battery 18 side and the charging power supply line PUL2 on the solar charger 23 side. The plug-in ECU 34 started by the output startup signal controls an electric power (current) supply path in a manner that allows, as described below, an external power supply to be supplied.

In particular, when the charging relay 27 is switched by the battery ECU 32 to a closed state (connected state), the solar ECU 31 raises (pumps up) and rectifies the low-voltage electric power temporarily stored in the low-voltage battery 22 with a high-voltage charging DC/DC converter in the charging control circuit 23a of the solar charger 23 to a predetermined voltage in a short period of time, and supplies the electric power whose voltage has been converted into a high voltage to the main battery 18 via the charging power supply line PUL3 and the charging power supply line PUL2. As a result, the battery ECU 32 can, by controlling charging in a known manner, store the electric power (electric power generated from solar light) supplied from the solar charger 23 (solar ECU 31) in the main battery 18.

Further, in this case, electric power in the sub-battery 19 is consumed in order to start up the various electronic components and the various ECUs. As a result, the solar ECU 31 rectifies the low-voltage electric power temporarily stored in the low-voltage battery 22 with the low-voltage charging DC/DC converter in the charging control circuit 23a of the solar charger 23, and supplies the electric power to the sub-battery 19 via the low-voltage power supply line PTL2, only while the voltage of the electric power is being raised (pumped up) as described above. Consequently, the state of charge of the sub-battery 19 can be made to recover, thereby preventing the sub-battery 19 from becoming "dead".

(b-2) "Ready OFF" State in which the I/G is in an on State

In cases such as, for example, when the driver or an occupant in the vehicle 100 wants to use an accessory device that can be operated by switching the ignition (I/G) to an on state, or when the engine 11 did not start successfully, the vehicle 100 is not traveling, and as shown in FIG. 3, the ignition (I/G) is in an on state, and, the vehicle 100 is in an "Ready OFF" state. In this case, because the load on the sub-battery 19 increases as a result of the operation of the accessory device in accordance with the wishes (will) of the driver or the occupant, the solar ECU 31 selects the sub-battery 19 as the charging destination, and supplies the electric power generated from solar light temporarily stored in the low-voltage battery 22 to the sub-battery 19.

In other words, the solar ECU 31 uses the low-voltage charging DC/DC converter in the charging control circuit 23*a* of the solar charger 23 to transform and rectify the electric power generated from solar light into a predetermined voltage, and then supplies and stores this electric power in the sub-battery 19 via the low-voltage power supply line PTL2. Note that, in this case too, obviously the solar charger 23 (solar ECU 31) supplies the electric power generated from solar light to the sub-battery 19 so that the sub-battery 19 is not overcharged, based on an SOC detected by a charging sensor (not shown) included in the sub-battery 19.

Thus, in a situation in which the load on the sub-battery 19 is increasing, namely, in a situation in which consumption of the electric power stored in the sub-battery 19 is increasing, the selection by the solar ECU 31 of the sub-battery 19 as the charging destination allows the electric power generated from solar light to be suitably supplied. As a result, the sub-battery 19 can be suitably prevented from becoming "dead". Note that, because the electric power supplied to the sub-battery 19 has a low voltage, as described above, a low-voltage power supply can be handled in the same manner as for traditional vehicles other than EVs, HVs, and PHVs, and as a result, the system and charging control can be simplified.

(c) During Plug-in Charging Using an External Power Supply

In a situation in which the ignition (I/G) is in an off state, for example, a situation in which the vehicle 100 is parked at the driver's home, the driver may perform charging using an external power supply, or so-called "plug-in charging". In plug-in charging, the solar ECU 31 changes the charging destination of the electric power generated from solar light to any one of the main battery 18 or the sub-battery 19 based on the supply state of the electric power being supplied from the external power supply to the main battery 18 by the plug-in ECU 34. Such cases are now described in more detail.

(c-1) Charging of the Main Battery 18 During Plug-in Charging

When the plug-in charger 24 of the vehicle 100 and a charging station are electrically connected to each other and plug-in charging is being carried out, or, when plug-in charging is scheduled to be carried out based on a programmed timer and the like, the plug-in ECU 34 charges the main battery 18 by supplying an external power supply (commercial power supply) from the charging station to the main battery 18. Further, when the main battery 18 is being charged by the external power supply, the solar ECU 31 supplies the electric power generated from solar light to the main battery 18.

At this stage, based on communication to/from the solar ECU 31, when electric power is being supplied from the solar charger 23 to the main battery 18, the plug-in ECU 34 selects the charging power supply line PUL4 as the supply path for the electric power (current) from the external power supply, and via the charging power supply line PUL4 and the charging power supply line PUL3 electrically connected to the solar charger 23, supplies electric power (current) to the main battery 18. In other words, when the electric power generated from solar light is being supplied from the solar charger 23, the plug-in ECU 34 merges the electric power (current) being supplied from the external power supply with the electric power (current) being supplied via the charging power supply line PUL3, and supplies the merged electric power to the main battery 18.

As a result, the electric power required in order to charge the main battery 18 can be met by the electric power supplied from the external power supply and the electric power generated from solar light. In other words, of the amount of electric power required to charge the main battery 18, the amount of electric power supplied from the plug-in charger 24 is obtained by subtracting the amount of electric power supplied from the solar charger 23 from the amount of electric power required to charge the main battery 18. Therefore, when the electric power from the solar charger 23 is used in conjunction with plug-in charging, the amount of electric power (current) supplied from the external power supply in order to charge the main battery 18 decreases. This enables the driver of the vehicle 100 to reduce the charging costs that arise through the use of the external power supply (commercial power supply).

On the other hand, regarding the electric power stored in the main battery 18, the ratio of electric power supplied from the solar charger 23, namely, the ratio of the electric power generated from solar light, which is renewable energy, can be actively increased. As a result, for example, depending on the region in which the vehicle 100 is traveling, fuel consumption (electricity consumption) is calculated based on the ratio of the electric power generated from solar light, and from an environmental protection perspective, the driver of the vehicle 100 may receive preferential treatment due to improved fuel consumption (electricity consumption).

Further, for example, when electric power is not being supplied from the solar charger 23 to the main battery 18 because the amount of electric power generated by the in-vehicle solar cell 21 is low due to bad weather, the plug-in ECU 34 supplies electric power (current) to the main battery 18 by selecting the charging power supply line PUL2 as the supply path for the electric power (current) from the external power supply. As a result, the main battery 18 can be reliably charged using the stably-supplied external power supply (commercial power supply), which allows the driver to use the vehicle 100 in accordance with his/her own schedule.

(c-2) Charging of the Sub-Battery 19 after Plug-in Charging

When the plug-in charger 24 of the vehicle 100 and the charging station have been electrically connected to each other and charging of the main battery 18 has been completed as described above, the plug-in ECU 34 stops plug-in charging. In other words, based on communication to/from the battery ECU 32, when the SOC of the main battery 18 is at a preset SOC that is predetermined in order to determine the fully-charged state of the main battery 18, the plug-in ECU 34 disconnects the electric power from the external power supply. On the other hand, based on the fact that plug-in charging by the plug-in ECU 34 has stopped, namely, that the supply of electric power from the external power supply has stopped, the solar ECU 31 changes the charging destination for supplying and storing the electric power generated from solar light from the main battery 18 to the sub-battery 19.

As a result, dark current consumed by the various accessory devices can be suitably compensated for with the electric power supplied from the sub-battery 19 when the vehicle 100 is stopping or parking (in particular, when the engine 11 is stopped). Therefore, the sub-battery 19 can be prevented from becoming "dead" in advance. Further, by changing the charging destination to the sub-battery 19 when charging of the main battery 18 is complete, overcharging of the main battery 18 can be avoided, with the result that the main battery 18 can be suitably protected.

(d) During Charging in a State in which the I/G has been Switched to the "Accessory" Position When the ignition (I/G) has been switched by the driver to the "accessory" position, it can be determined that the driver or an occupant wants to operate and use an accessory device without starting the engine 11, namely, without consuming gasoline or diesel. Therefore, the charging controller 30 selects the sub-battery 19 as the charging destination and supplies the electric power generated from solar light in order to continuously operate the accessory device in accordance with the driver's or occupant's wishes.

Specifically, similar to the above-mentioned case in (b-2) or the above-mentioned case in (c-2), the solar ECU 31 uses the low-voltage charging DC/DC converter in the charging control circuit 23a of the solar charger 23 to transform and rectify the electric power generated from solar light into a predetermined voltage, and then supplies the electric power to the sub-battery 19 via the low-voltage power supply line PTL2. Note that, in this case too, the solar charger 23 (solar ECU 31) supplies the electric power generated from solar light to the sub-battery 19 so that the sub-battery 19 is not overcharged, based on an SOC detected by a charging sensor (not shown) included in the sub-battery 19.

Thus, for example, in a situation in which the an accessory device is being operated by only the electric power of the sub-battery 19 in accordance with the wishes of the driver or the occupant, namely, in a situation in which consumption of the electric power stored in the sub-battery 19 is increasing, the wishes of the driver or the occupant can be suitably reflected by using the electric power generated from solar light. Further, by supplying the electric power generated from solar light to the sub-battery 19, the sub-battery 19 can be suitably prevented from becoming "dead". Note that, even in this case, because the electric power supplied to the sub-battery 19 has a low voltage, as described above, a low-voltage power supply can be handled in the same manner as for traditional vehicles other than EVs, HVs, and PHVs, and as a result, the system and charging control can be simplified.

As can be understood from the above description, according to this embodiment, when the vehicle 100 is traveling, namely, when there is a possibility that the electric power of at least the main battery 18 is being supplied to the motor generator 14, the electric power generated by the in-vehicle solar cell 21 can be prevented from being supplied to the main battery 18 directly from the in-vehicle solar cell 21, or via the low-voltage battery 22. This eliminates the need to execute more complex controls without having an effect on how the main battery 18 is managed based on, for example, high-voltage system management, high-voltage battery control, opening/closing control of an electric power opening/closing device (a relay etc.), and power supply control, namely, by avoiding competition among the controls and the like. Therefore, an increase in development scale and in development costs can be suppressed, and the electric power generated from solar light can be appropriately used.

Further, the electric power generated by the in-vehicle solar cell 21 can be temporarily stored in the low-voltage battery 22, and the generated electric power can be supplied to the sub-battery 19 when the vehicle 100 is traveling. In addition, by temporarily storing the electric power generated by the in-vehicle solar cell 21 in the low-voltage battery 22, when the vehicle 100 is stopping of parking, obviously not only can the electric power be supplied to the sub-battery 19, but the electric power generated from solar light can also be supplied to the main battery 18. As a result, the electric power generated by the in-vehicle solar cell 21 can be used in an even more efficient manner.

<Modified Example>

Figure 5:
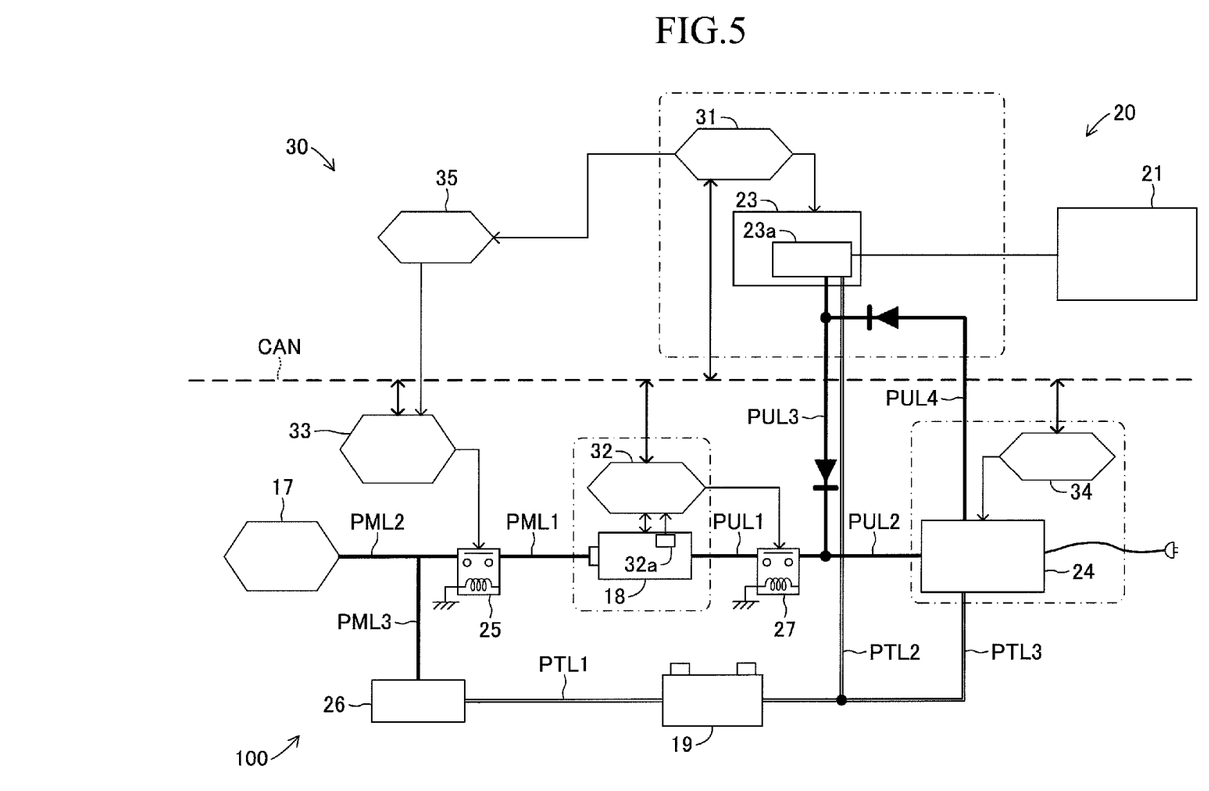
FIG. 5 is a block diagram for schematically illustrating a configuration of an electric power supply unit and a charging controller installed in the vehicle according to a modified example of the embodiment the present invention.

In the above-mentioned embodiment, the electric power supply unit 20 of the vehicle 100 includes the low-voltage battery 22, and the electric power generated from solar light generated by the in-vehicle solar cell 21 is temporarily (provisionally) stored in the low-voltage battery 22. In this case, as illustrated in FIG. 5, the low-voltage battery 22 may be omitted, and the electric power generated from solar light may be temporarily (provisionally) stored in the sub-battery 19.

Figure 6:
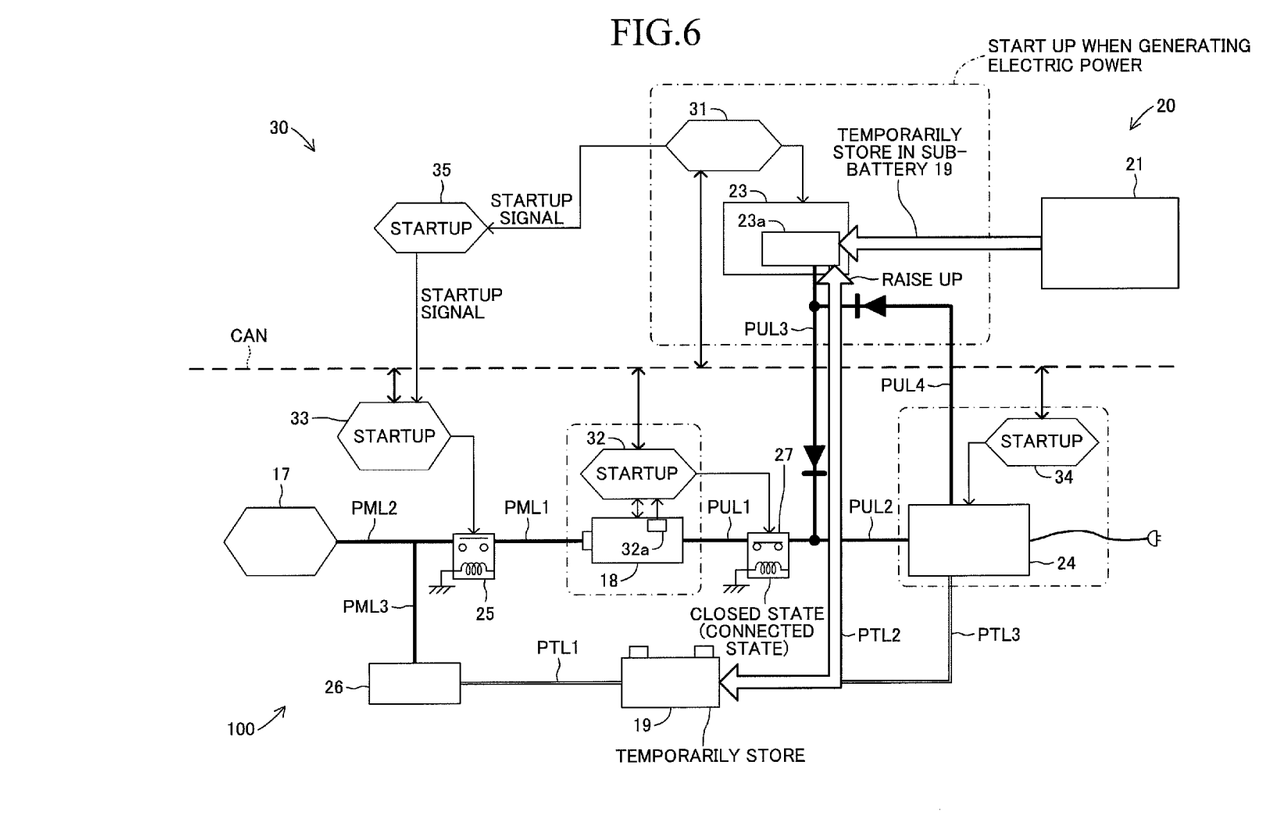
FIG. 6 is a diagram for illustrating operation of the electric power supply unit and the charging controller according to the modified example of the embodiment the present invention.

Specifically, in this case, as illustrated in FIG. 6, the solar ECU 31 temporarily (provisionally) stores the electric power generated from solar light by the in-vehicle solar cell 21 in the sub-battery 19 via the charging control circuit 23a of the solar charger 23. Note that, as described above with respect to the various different situations, the electric power generated from solar light to be stored in the sub-battery 19 may be used by supplying the electric power from the sub-battery 19. In particular, in a situation in which the main battery 18 is selected as the charging destination, such as in the case of (b-1), the solar ECU 31 executes charging control when the level of electric power temporarily stored in the sub-battery 19 is at least a predetermined operational electric power level or more. Specifically, when the level of electric power stored in the sub-battery 19 is the predetermined operational electric power level or more, as illustrated in FIG. 6, after verification by the verification ECU 35, the solar ECU 31 outputs a startup signal and starts the battery ECU 32, the hybrid ECU 33, and the plug-in ECU 34.

In particular, when the charging relay 27 is switched by the battery ECU 32 to a closed state (connected state), as illustrated in FIG. 6, the solar ECU 31 raises (pumps up) and rectifies the low-voltage electric power temporarily stored in the sub-battery 19 with a high-voltage charging DC/DC converter in the charging control circuit 23a of the solar charger 23 to a predetermined voltage in a short period of time via the low-voltage power supply line PTL2, and supplies the electric power whose voltage has been converted into a high voltage to the main battery 18 via the charging power supply line PUL3 and the charging power supply line PUL2. As a result, the battery ECU 32 can, by controlling charging in a known manner, store the electric power (electric power generated from solar light) supplied from the sub-battery 19 by the solar charger 23 (solar ECU 31) in the main battery 18.

Therefore, according to this modified example, there is no need to separately include the low-voltage battery 22 for temporarily (provisionally) storing the electric power generated from solar light by the in-vehicle solar cell 21. Consequently, an increase in costs resulting from including the low-voltage battery 22 can be suppressed and there is no need to secure a space for arranging the low-voltage battery 22, which enables space savings to be made and a light weight to be achieved. The other advantageous effects that can be obtained by the modified example are the same as the advantageous effects obtained by the embodiment described above.

The implementation of the present invention is not limited to the above-mentioned embodiment and modified example. Various changes may be made, as long as such changes do not depart from the object of the present invention.

For example, in the above-mentioned embodiment, the electric power generated from solar light by the in-vehicle solar cell 21 is temporarily stored in the low-voltage battery 22, and in the above-mentioned modified example, the electric power generated from solar light is temporarily stored in the shared sub-battery 19. However, it is also possible for the electric power generated from solar light to be supplied to the main battery 18 and the sub-battery 19 without temporarily storing the electric power in the low-voltage battery 22, or for the electric power generated from solar light to be supplied to the main battery 18 without temporarily storing the electric power in the sub-battery 19.

In this case too, the electric power generated from solar light can be prevented from being supplied to the main battery 18 while the vehicle 100 is traveling. Further, when the vehicle 100 is not traveling, because the electric power generated from solar light can be directly supplied from the in-vehicle solar cell 21 to the main battery 18 via the solar charger 23, the main battery 18 can be charged while ensuring reliability and safety during handling of the high-voltage power supply. Note that, in this case, the frequency with which the various electronic components and the various ECUs included in order to ensure reliability and safety are operated increases. Consequently, the charging efficiency (SOC) of the main battery 18 may deteriorate by an amount corresponding to the increase in the amount of electric power consumed by operating those electronic components compared with the above-mentioned embodiment and modified example.

Further, in the above-mentioned embodiment and modified example, for example, in the case of (c-1), the electric power supplied from the solar charger 23 to the main battery 18 (namely, electric power generated from solar light having an increased voltage), and the electric power from the external power supply (commercial power supply) supplied from the plug-in charger 24 to the main battery 18 are merged. As a result, the ratio of renewable energy to the electric power (electrical energy) stored in the main battery 18 increases, and the amount of electric power bought from the commercial power supply is reduced.

In this case, for example when the level (amount of electric power) of the electric power generated by the in-vehicle solar cell 21 is less than the level (amount of electric power) of the electric power from the external power supply (commercial power supply), the solar ECU 31 may select the sub-battery 19 as the charging destination. In other words, in this case, only the plug-in charger 24 supplies electric power from the external power supply (commercial power supply) to the main battery 18 via the charging power supply line PUL2, and the solar charger 23 supplies the electric power generated from solar light to the sub-battery 19 via the low-voltage power supply line PTL2. As a result, unlike the above-mentioned case of (b-1), in a situation in which plug-in charging is being carried out in parallel (c-1), for example, the load on the in-vehicle solar cell 21 and on the solar charger 23 can be reduced, which allows usable periods (life) of those parts to be extended.

The invention claimed is:

1. A charging control device configured to use an in-vehicle solar cell installed in a vehicle, which is to be applied to the vehicle, the vehicle comprising:
a motor generator configured to generate a driving force and to generate regenerative electric power;
a main battery electrically connected to the motor generator, the main battery being configured to supply electric power to the motor generator and to store the regenerative electric power; and a sub-battery configured to supply electric power to various accessory devices mounted on the vehicle, the vehicle being capable of traveling using at least the driving force generated by the motor generator, the charging control device comprising:
an electric power supply unit comprising the in-vehicle solar cell, which is configured to supply electric power generated by the in-vehicle solar cell to at least one of the main battery and the sub-battery;
and a charging control unit configured to control charging of at least one of the main battery and the sub-battery using the electric power generated by the in-vehicle solar cell and supplied from the electric power supply unit, the charging control unit being configured to, when the vehicle is traveling, prevent the electric power generated by the in-vehicle solar cell from being supplied from the electric power electric power unit to the main battery,
wherein a predetermined electric power level is set based on a level of electric power consumed by various electronic components operating as a result of the charging control of the main battery.

2. The charging control device configured to use an in-vehicle solar cell according to claim 1, wherein the charging control unit is configured to, when the vehicle is traveling, supply the electric power generated by the in-vehicle solar cell from the electric power supply unit to the sub-battery.

3. The charging control device configured to use an in-vehicle solar cell according to claim 1,
wherein the electric power supply unit comprises a low-voltage battery configured to temporarily store the electric power generated by the in-vehicle solar cell, and
wherein the charging control unit is configured to at least, when the vehicle is traveling, supply the electric power generated by the in-vehicle solar cell and temporarily stored in the low-voltage battery to the sub-battery.

4. The charging control device configured to use an in-vehicle solar cell according to claim 1, wherein the charging control unit is configured to permit, when the vehicle is not traveling, the electric power generated by the in-vehicle solar cell to be supplied from the electric power supply unit to the main battery.

5. The charging control device configured to use an in-vehicle solar cell according to claim 4, wherein the charging control unit is configured to permit, when an amount of the electric power generated by the in-vehicle solar cell is more than the predetermined amount charging control device of electric power set in advance, the electric power generated by the in-vehicle solar cell to be supplied from the electric power supply unit to the main battery.

6. The charging control device configured to use an in-vehicle solar cell according to claim 1, wherein the electric power supply unit is further configured to supply, when the vehicle is not traveling, electric power supplied externally from the vehicle to at least the main battery, and wherein the charging control unit is configured to supply the electric power generated by the in-vehicle solar cell to the main battery or the sub-battery based on a supply state of the external electric power in the electric power supply unit.

7. The charging control device configured to use an in-vehicle solar cell according to claim 6, wherein the charging control unit is configured to supply, when the electric power supply unit is charging the main battery by supplying the external electric power to the main battery, the electric power generated by the in-vehicle solar cell to the main battery.

8. The charging control device configured to use an in-vehicle solar cell according to claim 6, wherein the charging control unit is configured to supply, when the charging of the main battery is complete, the electric power generated by the in-vehicle solar cell to the sub-battery.

9. The charging control device configured to use an in-vehicle solar cell according to claim 1, wherein the charging control unit is configured to supply, when the vehicle is not traveling, and when the various accessory devices are operating based on an operation request from an occupant in the vehicle, the electric power generated by the in-vehicle solar cell from the electric power supply unit to the sub-battery.

* * * * *